(12) United States Patent
Ding et al.

(10) Patent No.: US 11,233,386 B2
(45) Date of Patent: Jan. 25, 2022

(54) USB TYPE-C PORT SHORT PROTECTION

(71) Applicant: Google LLC, Mountain View, CA (US)

(72) Inventors: Yao Ding, San Jose, CA (US); Hui Li, Mountain View, CA (US)

(73) Assignee: Google LLC, Mountain View, CA (US)

( * ) Notice: Subject to any disclaimer, the term of this patent is extended or adjusted under 35 U.S.C. 154(b) by 226 days.

(21) Appl. No.: 16/287,422

(22) Filed: Feb. 27, 2019

(65) Prior Publication Data

US 2020/0274346 A1    Aug. 27, 2020

(51) Int. Cl.
*H02H 3/08* (2006.01)
*H02H 1/00* (2006.01)

(52) U.S. Cl.
CPC ............ *H02H 3/08* (2013.01); *H02H 1/0007* (2013.01)

(58) Field of Classification Search
CPC .............................. H02H 3/08; H02H 1/0007
USPC ........................................................ 361/93.1
See application file for complete search history.

(56) References Cited

U.S. PATENT DOCUMENTS

| 5,861,802 A * | 1/1999 | Hungerink | ............ | B62D 53/12 |
| | | | | 280/433 |
| 2008/0246441 A1 | 10/2008 | Tsubaki et al. | | |
| 2016/0191049 A1 | 6/2016 | Lee et al. | | |
| 2017/0264204 A1 * | 9/2017 | Motoki | ................... | H02M 1/32 |
| 2018/0019587 A1 * | 1/2018 | Chen | ................... | H02H 7/1213 |

FOREIGN PATENT DOCUMENTS

CN          108988293 A       12/2018

OTHER PUBLICATIONS

International Search Report and Written Opinion for International Application No. PCT/US2019/064908 dated May 12, 2020. 13 pages.

* cited by examiner

*Primary Examiner* — Jared Fureman
*Assistant Examiner* — Lucy M Thomas
(74) *Attorney, Agent, or Firm* — Lerner, David, Littenberg, Krumholz & Mentlik, LLP

(57) ABSTRACT

A short circuit protection circuit may comprise a first configuration channel line extending from a first connector, a first resistor connected to the first configuration channel line; a voltage divider connected to a junction point on the first configuration channel line, the voltage divider comprising a second resistor and a thermistor, and a field effect transistor (FET) comprising a source, gate, and drain. The thermistor may be connected to a ground line. The drain of the FET may be connected to the first resistor, the source of the FET may be connected to the ground line, and the gate of the FET may be connected to a second junction point between the second resistor and thermistor of the voltage divider.

18 Claims, 6 Drawing Sheets

100

USB TYPE-C PORT SHORT PROTECTION

BACKGROUND

As a space and cost saving measure, electronic devices are being constructed with a single connector for power and data communication. This is particularly true for small form factor devices, such as mobile phones, smartwatches, earbuds, Bluetooth headsets and speakers, head-mounted displays, etc. An increasingly common connector being integrated into these devices is the Universal Serial Bus (USB) Type-C port which includes capabilities for both power and data communication. In this regard, a USB Type-C connector system is capable of delivering large amounts of power relative to other legacy USB systems, while also providing a path for high speed data communication over a single USB Type-C compliant cable having a reversible connector.

The increased amount of power delivered by the USB Type-C connector system, which may be upwards of 100 watts, may present safety issues not realized in other systems which handle lower amounts of power. For instance, in the event one or more of the power supply lines, known as VBUS lines, within the USB Type-C connector system become short circuited to the ground, such as by a buildup of dust within a USB Type-C port or some other conductive object entering a port, the port may become overheated. The overheated USB Type-C port may lead to the port, or other components connected to, or in the vicinity of, the port burning or incurring other damage as a result of the excessive heat. In addition, there is a risk of a user suffering from burns or being shocked if they contact that overheated port or the other affected components.

SUMMARY

Aspects of the disclosure are directed to a short circuit protection circuit comprising a first configuration channel line extending from a first connector; a first resistor connected to the first configuration channel line; a voltage divider connected to a junction point on the first configuration channel line, the voltage divider comprising a second resistor and a thermistor, wherein the thermistor is connected to a ground line; and a field effect transistor (FET) comprising a source, gate, and drain, wherein the drain is connected to the first resistor, the source is connected to the ground line, and the gate is connected to a second junction point between the second resistor and thermistor of the voltage divider.

In one example, the first configuration channel line outputs a voltage at the first connector when the FET is on.

In one scenario, a diode positioned on the first configuration channel line between the first resistor and the junction point.

In some embodiments, the voltage divider outputs a voltage at the second junction point.

In some instances, the short circuit protection circuit further comprises a second configuration channel line extending from the first connector.

In some embodiments, the short circuit protection circuit further comprises a third resistor connected to the second configuration channel line, wherein the third resistor is connected to the drain of the FET. In one example, the short circuit protection circuit further comprises a diode positioned on the second configuration channel line between the third resistor and the junction point. In some instances, the short circuit protection circuit further comprises a capacitor, wherein the capacitor is connected on a first end to a second junction on the configuration channel line located between the diode and the second resistor and the capacitor is connected on a second end to the ground line. In some instances, the capacitor stabilizes the voltage at the junction point.

In some embodiments, the FET is configured to turn on when a voltage at the gate is above a threshold value and turn off when the voltage at the gate is below the threshold value. In some examples, power is delivered over a power supply line extending from the first connector when the FET is on and no power is delivered over the power supply line when the FET is off.

In some embodiments, the voltage divider outputs a lower voltage at the second junction point when the thermistor is at a higher temperature than when the thermistor is at a lower temperature.

In some embodiments, the short circuit protection circuit further comprises a third diode, wherein the diode connects a power supply line extending from the first connector to the junction point. In some examples, the short circuit protection circuit further comprises a low-dropout regulator (LDO) positioned inline between the junction point and the voltage divider, wherein the LDO stabilizes a voltage at the voltage divider and/or lowers the voltage provided at the junction point.

In some embodiments, the FET is metal-oxide-semiconductor field-effect transistor (MOSFET).

Another aspect of the disclosure is directed to a system comprising a first port having a first set of pins; a second port having a second set of pins, wherein the second port is configured to electrically connect to the first port via one or more electrical connections between the first set of pins and the second set of pins; a power supply line extending from a second pin in the second port, a power supply for providing a voltage to a first configuration channel line at a first pin in the first port, wherein the first pin in the first port is connected to the first pin in the second port; a short circuit protection circuit, the short circuit protection circuit comprising: a voltage divider comprising a first resistor and a thermistor; and a field effect transistor (FET); and a controller configured to detect the voltage on the first configuration channel line at the first pin in the first port, wherein when the controller detects a voltage on the first pin in the first port being above a threshold value, the controller triggers power delivery on the power supply line.

In some embodiments, the power is delivered on the power supply line from the first port to the power supply line via a connection between a second pin in the first port and the second pin in the second port.

In some embodiments, the short circuit protection circuit further comprises: a second resistor connected to the first configuration channel line; and a diode positioned on the first configuration channel line between the second resistor and a junction point. In some examples, the FET comprises a source, gate, and drain, wherein the drain is connected to the second resistor, the source is connected to a ground line, and the gate is connected to a second junction point between the first resistor and thermistor of the voltage divider, wherein the FET is configured to turn on when a voltage at the gate is above a second threshold value, wherein when the FET is on, voltage at the first pin in the first port is above the threshold value. In some examples, the FET is configured to turn off upon a voltage at the gate being below the second threshold value, wherein when the FET is off, the voltage at the first pin in the first port is below the threshold value.

DETAILED DESCRIPTION

Overview

The technology relates generally to circuit designs for reducing the risk of a short circuited power supply line damaging a port. Such circuitry may be implemented in any number of devices where power is supplied through a USB Type-C system. In this regard, power delivery through the USB Type-C system requires a valid connection to be made between two USB Type-C ports before power is supplied. According to this disclosure, and as described in detail herein, the circuitry leverages the way a valid connection is detected, as well as the heat generated by a short circuited power supply line, to turn off the power supplied through the power supply line. For example, the circuitry utilizes a voltage divider including a negative temperature coefficient (NTC) thermistor to control the operation of the transistor. When the thermistor is heated up as the result of the short circuited power supply line, the transistor may be switched off. In the off position, the transistor makes it appear that a valid connection is not present between two ports which are otherwise validly connected. As a result, the power supply line may be turned off to prevent excessive heat from damaging the port.

The short circuit protection circuit (SCPC) includes a pair of resistors which operate as a voltage divider. One or more of the resistors may be a thermistor that has a variable resistance which is dependent upon its temperature. In this regard, the higher the temperature of the thermistor the lower the resistance of the thermistor. As such, the voltage output by the voltage divider decreases as the thermistor 337 heats up.

The SCPC also includes a transistor, such as a MOSFET, which is controlled by the voltage of the voltage divider. In this regard, when the voltage output by the voltage divider is sufficiently high, as described herein, the transistor turns on. Upon the transistor turning on, a valid connection between the USB Type-C ports may be determined, such as by a controller or other such processor, and power may be delivered over the power supply line.

In instances where the voltage divider is insufficient, such as in instances where the thermistor heats up beyond a certain threshold, the transistor may turn off. Upon turning off, a valid connection between the USB Type-C ports may no longer be determined by a controller, or other such processor, and power delivery over the power supply line may be turned off.

The features described may reduce the risk of a short circuited power supply line damaging a port or components connected to, or in the vicinity of the port. In addition, the circuitry described may reduce the risk of a user suffering from burns or being shocked from an overheated port or other components. In some instances, the circuitry may allow power to be supplied over a shorted power supply line as long as the heat generated by the short circuited power supply line remains within a safe temperature range.

Example Systems

Figure 1:
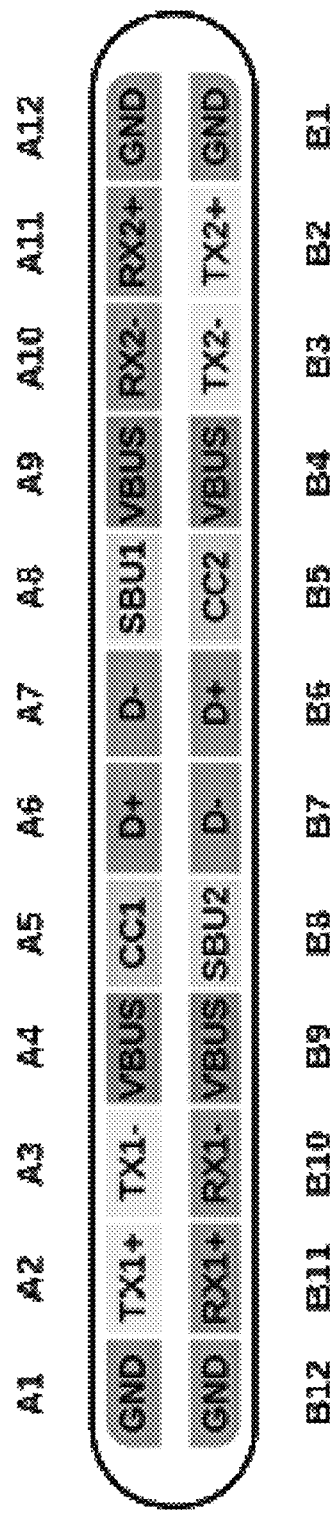
FIG. 1 is an illustration of a pin layout within an example USB Type-C port according to aspects of the disclosure.

A USB Type-C port may include two sets of pins which are rotationally-symmetrical to allow a connector to be reversibly connected to the port. For example, and as shown in example USB Type-C port 100 of FIG. 1, the port contains two sets of 12 pins, A1-A12 and B1-B12. Pins A1, A12, B1 and B12 (GND) may be ground contacts. Pins A2 and B2 (TX1+) and A3 and B3 (TX1−) can form respective pairs of high speed transmission paths. Pins A4, B4, A9, and B9 can be bus power (VBUS) contacts. Pins A5 and B5 (CC1, CC2) can form a configuration channel (CC) path. Pins A6, A7, B6, and B7 (D+, D−) may form a differential pair path. Pins A8 and B8 can form a side band use (SBU1, SBU2). Pins A10 and A11 (RX2−, RX2+), B10 and B11 (RX1−, RX1+) may form high speed transmission differential pair. Although the USB Type-C ports discussed herein are described as female receptacles configured to receive a male connector, the USB Type-C ports may be a male receptacle configured to receive a female connector, or the USB Type-C ports may be configured as male or female connectors configured to attach to female or male receptacles. The technology discussed herein may also be implemented in other buses and connectors, such as connectors which have separate control lines which control the delivery of power.

A typical USB Type-C system may include two USB Type-C ports, including a downstream facing port (DFP) and an upstream facing port (UFP). The DFP may be configured to provide power to the UFP over one or more power supply lines after a valid connection between the DFP and UFP is made. For example, USB Type-C system 200 shown in FIG. 2 includes DFP 221 and UFP 225. USB Type-C compliant cable 230 connects CC pin 201 of the DFP 221 with CC pin 205 of the UFP 225 together. As USB Type-C cable 230 contains only a single CC line, if the cable 230 is reversed in the DFP 221 and/or the UFP 225, connections between different CC pins may be made. For instance, CC pin 201 may be connected to CC pin 207 or CC pin 203 may be connected to CC pin 205 or 207.

Figure 2:
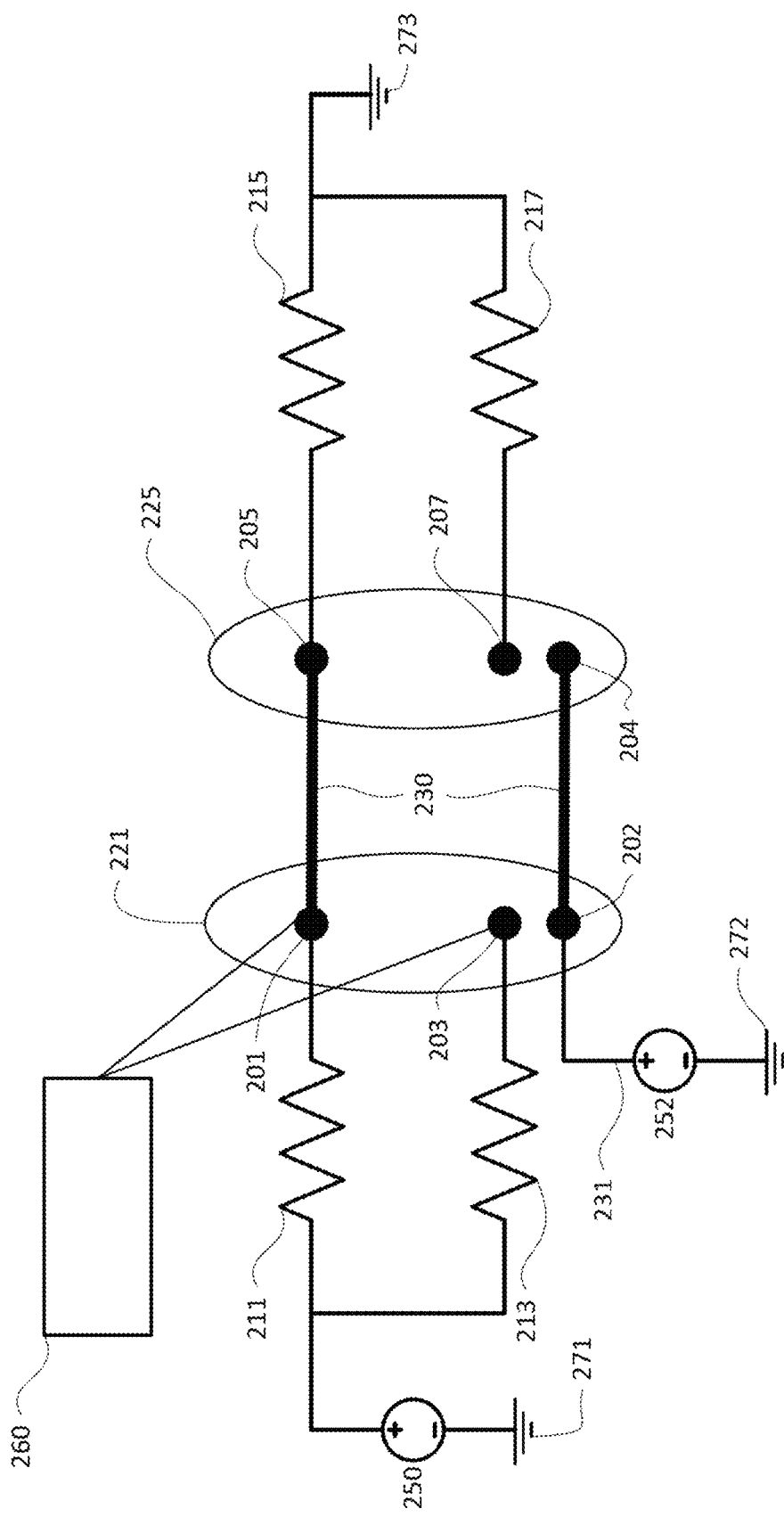
FIG. 2 is an example illustration of a typical USB Type-C connector system according to aspects of the disclosure.

The cable 230 also connects VBUS pin 202 of the DFP 221 with VBUS pin 204 of the UFP 225. Although only a single VBUS line 231 is shown in FIG. 2, power may be delivered over more than one VBUS line and between more than one pair of VBUS pins between the DFP 221 and UFP 225. Other connectors may be used in conjunction with or in place of cable 230 to connect DFP 221 and UFP 225. While the ground lines 271, 272, and 273 are shown as independent lines, it should be understood that each of the UFP 221 and DFP 225, as well as components connected thereto, may share a common ground line. In this regard, cable 230 may provide a connection between one or more ground pins in the DFP 221 and UFP 225 (not shown) to tie the various grounds (i.e., 271, 272, 273, etc.) together.

A valid connection between the DFP 221 and UFP 225 may be indicated by a particular voltage being present at one or more configuration channel (CC) pins within the DFP 221. In this regard, a controller or other processor, such as controller 260 may monitor the configuration channel (CC) pins 201, 203 for a particular voltage. The particular voltage may be a predefined voltage or a voltage within a range of voltages, such as a voltage between 0.5V and 3V, or more or less. Upon detecting the particular voltage, the controller 260 may trigger a power source, such as power source 252 to deliver power over the VBUS line 231.

The voltage at the CC pins 201 and/or 203 may be based upon the voltage generated by a power source and the resistance of resistors connected to the CC pins. For example, and as further shown in FIG. 2, CC pins 201 and 203 of the DFP 221 are connected to power source 250 via pull-up resistors 211 and 213, respectively and CC pins 205 and 207 of the UFP are connected to ground 273 via pull-down resistors 215 and 217, respectively. The power source 250, which may be the same or different than power source 252, may continually, or intermittently, generate a voltage of 3-5 volts, or more or less.

The pull-up resistors and the pull-down resistors may form a voltage divider which divides the voltage provided by power source 250 to present a particular voltage at one of the CC pins. For example, when CC pins 201 and 205 are connected by cable 230 as shown in FIG. 2, pull-up resistor 211 and pull-down resistor 215 may form a voltage divider which presents a particular voltage at CC pins 201 and 205. In instances where the cable 230 is reversed, a voltage divider may be formed by different pairs of resistors, such as resistor 211 and 217 or resistor 213 and resistor 215 or 217. The resistance of the pull-up resistors 211, 213 may be indicative of the current sourcing capability of a power supply 252 and may be between 4 kΩ and 56 kΩ, or more or less. The resistance of pull-down resistors may be around 5 kΩ, or more or less.

In operation, when the DFP 221 is not connected to UFP 225, the voltage at the unterminated CC pins 201, 203 may be between 3-5V, or more or less. In instances where the UFP 225 is connected to the DFP 221, such as shown in FIG. 2, the voltage of CC pin 201 may be the particular voltage, such as a voltage between 0.5V and 3V, and pin 203 may be 0V, or more or less. The controller 260 may detect the particular voltage at CC pin 201 and trigger, or otherwise activate power source 252, which in turn may deliver power to the UFP 225 via the VBUS 231. Power source 252 may continue to provide voltage as long as the particular voltage is detected at pin 201 by the controller. That is to say, power source 252 provides voltage over the VBUS 231 as long as a valid connection is detected between DFP 221 and UFP 225.

As used herein, the circuitry and components located before the DFP 221, including pull-up resistors 211, 213, and power sources 250 and 252, is considered downstream circuitry. The circuitry located after the UFP 225, including the pull-down resistors 215, 217 is considered upstream circuitry. Although FIG. 2 shows the downstream circuitry as being outside the DFP 221 and the upstream circuitry as being outside the UFP 225, some or all of the downstream circuitry may be integrated into the DFP 221 and some or all of the upstream circuitry may be integrated into the UFP 225.

Figure 3:
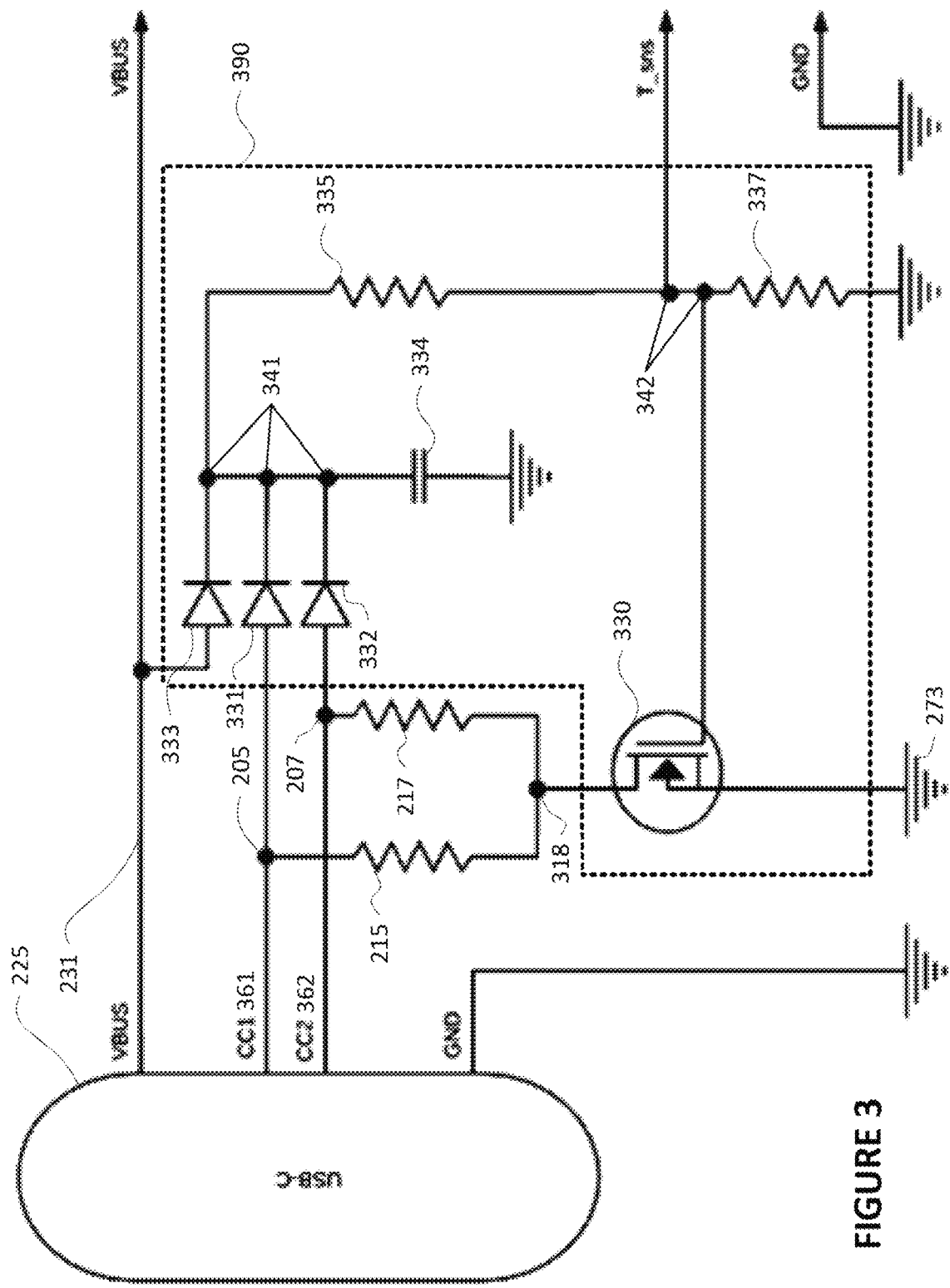
FIG. 3 is an example circuit diagram of a short circuit protection circuit according to aspects of the disclosure.

FIG. 3 provides a circuit diagram illustrating a circuit design of a short circuit protection circuit (SCPC) 390 integrated into the upstream circuitry. The SCPC 390 includes diode 331 positioned in parallel with pull-down resistor 215 on line CC1 361 and diode 332 positioned in parallel with pull-down resistor 217 on line CC2 362. Diodes 331 and 332 tie together at junction 341. The diodes 331 and 332 may prevent current from flowing from the SCPC 390 back towards the CC pins 205 and 207.

A capacitor may be used to minimize voltage fluctuation at junction 341 with the SCPC 390. For example, capacitor 334 is positioned inline between junction 341 and ground. The capacitor 334 may have a relatively small capacitance, such as 0.1 μF, or more or less. During a voltage change at junction 341, such as during a switch over from CC1 or CC2, and/or during VBUS being powered upon a qualified pull down via MOSFET 330 and pull-down resistor 215 or 217, capacitor 334 may release a stored charge to maintain a consistent voltage at junction 341.

A pair of resistors in the SCPC 390, including resistor 335 and negative temperature coefficient (NTC) thermistor 337, is used as a voltage divider to generate a voltage at junction 342. The voltage output by the voltage divider is dependent upon the temperature of the thermistor. In this regard, the thermistor has a variable resistance which is dependent upon its temperature, with a higher temperature resulting in a lower resistance. In other words, when thermistor 337 heats up its resistance decreases. Thermistor 337, which ties junction 342 to ground, may have a variable resistance between 100 kΩ and 0Ω, or more or less, depending upon its temperature. Resistor 335, which may be around 150 kΩ, or more or less, is positioned between junction 341 and junction 342.

The thermistor 337 may be positioned close to the VBUS pins of the UFP 225 so that heat at the VBUS pin affects the resistance of the thermistor. For instance, when the VBUS 231 is short circuited to ground, a buildup of heat may occur at the VBUS pins of the UFP 225, and in some instances, the VBUS 231 itself may generate excessive heat. This increased heat may cause the thermistor 337 to heat up and the resistance of the thermistor to decrease.

The SCPC 390 includes a MOSFET 330 with its drain attached to junction 318 and source attached to ground 273. The gate of the MOSFET 330 is attached to junction 342. When the gate of the MOSFET 330 is subjected to a certain voltage, such as 0.6V or more or less, the MOSFET may be turned on, thereby allowing current to travel between the drain and the source. In this regard, when gate of the MOSFET 330 is subjected to the certain voltage, current flows from junction 318 to ground 273. As a result, the pull-down resistors 215, 217 are connected to ground when the MOSFET 330 is on and unterminated when the MOSFET 330 is off. As explained above, the voltage at junction 342, to which the gate of the MOSFET is attached, is determined by the value of the voltage divider formed by resistor 335 and thermistor 337. Although SCPC 390 is shown as including a MOSFET, other field effect transistors may also be used.

A third diode 333 may be positioned between the VBUS 231 and junction 341. Diode 333 may provide junction 341 with the voltage on the VBUS 231 when the VBUS is powered. In this regard, the voltage provided on the VBUS 231 may be larger and/or more stable than the voltage provided over the CC pins, 205 and 207. As such, the voltage divider created by resistor 335 and thermistor 337 may operate more reliably with the voltage from the VBUS 231 than the voltage provided over the CC pins, 205 and 207. Diode 333 also prevents current from flowing back towards the VBUS from the SCPC 390.

Figure 4:
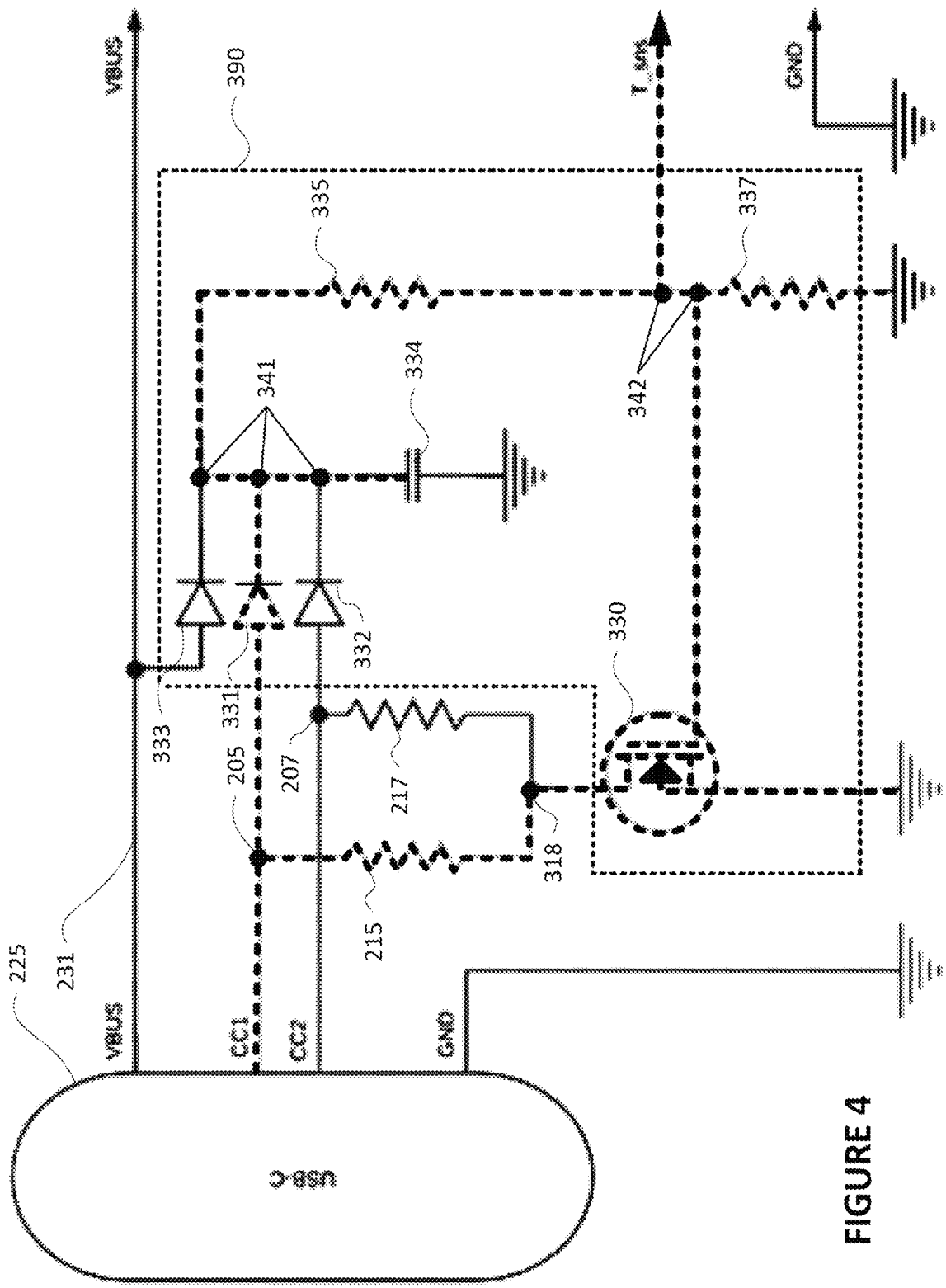
FIG. 4 is an example circuit diagram illustrating the operation of a short circuit protection circuit according to aspects of the disclosure.

FIG. 4 illustrates the operation of the SCPC 390 when the UFP 225 is connected to a DFP (not shown) and a voltage is provided to pin CC1 205 by a power source, such as power source 250. For example, current, illustrated by the dashed line, flows through diode 331 to the voltage divider formed by resistor 335 and thermistor 337. The voltage presented at junction 342 by the voltage divider may be about 0.8V, or more or less depending upon the voltage provided by the power source.

The voltage presented at junction 342 by the voltage divider turns on the MOSFET 330, as further illustrated in FIG. 4. As a result of turning on the MOSFET 330, junction 318 is grounded which pulls pull-down resistor 215 to ground. Current passing through pull-down resistor 215 generates a particular voltage at CC pin 205, such as a voltage between 0.5V and 3V. As CC pin 205 is connected to a corresponding CC pin on the DFP, a controller, such as controller 260 may detect the particular voltage at the CC pin of the DFP and trigger, or otherwise activate a power source to deliver power to the UFP 225 via the VBUS 231. In instances where voltage is provided to pin CC2 207, the operation of the SCPC 390 will be similar, however current will flow through diode 332 and pull-down resistor 217 instead of diode 331 and pull-down resistor 215.

Figure 5:
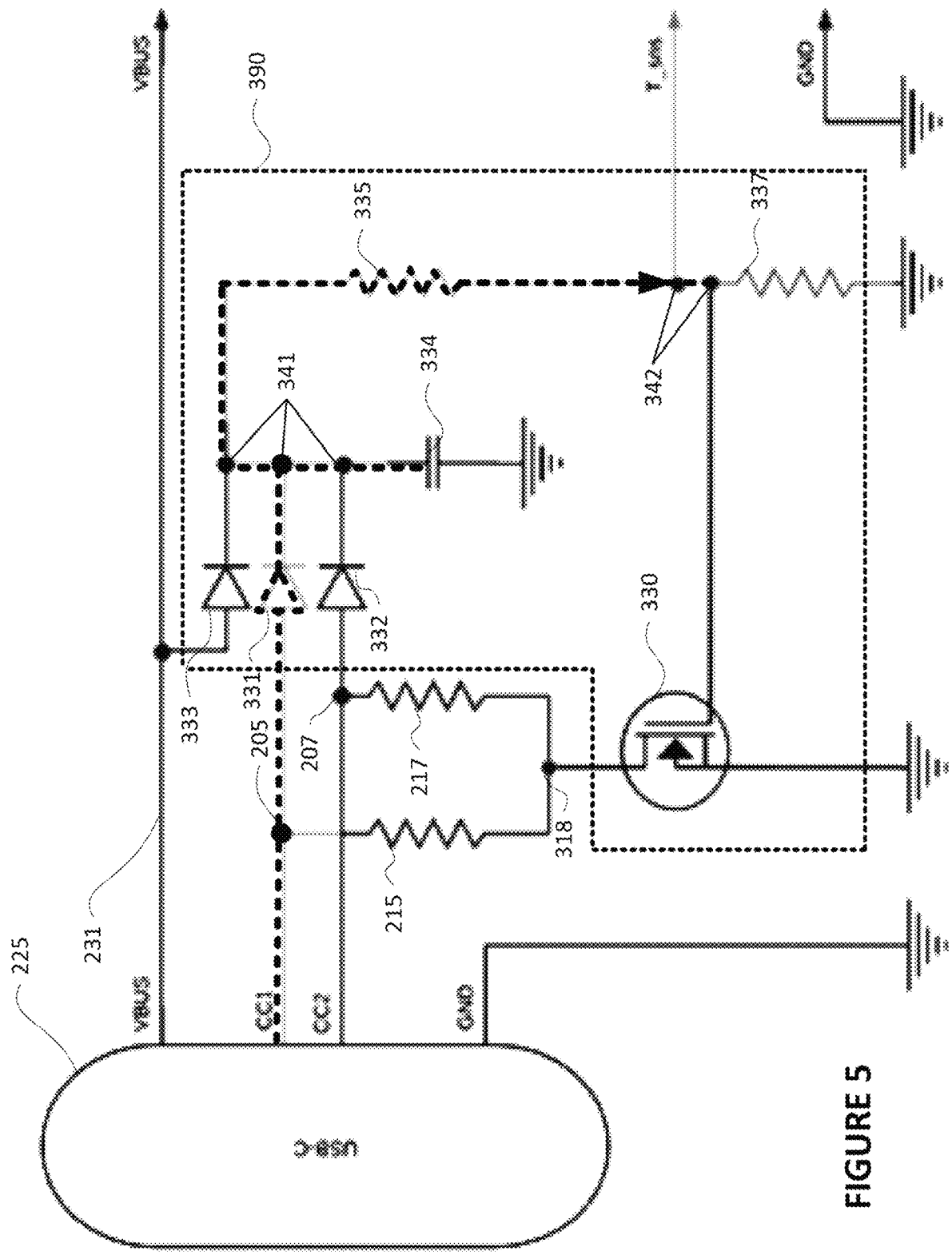
FIG. 5 is an example circuit diagram illustrating the operation of a short circuit protection circuit according to aspects of the disclosure.

FIG. 5 illustrates the operation of the SCPC 390 when the VBUS 231 is short circuited. As discussed above, when the VBUS 231 is shorted, excessive heat is generated at the VBUS pins of the UFP 225. As the heat generated by the VBUS pin rises, the heat that is generated propagates to the thermistor 337 and increases the thermistor's temperature. The increased temperature of the thermistor 337 reduces the resistance of the thermistor. The reduced resistance of thermistor 337 reduces the voltage at junction 342 presented by the voltage divider created by resistor 335 and thermistor 337.

Upon the voltage at junction 342 crossing below a certain voltage, such as 0.6V, or more or less, the gate of the MOSFET 330 may be turned off. Turning off the MOSFET 330 may release the connection between pull-down resistors 215, 217 and ground thereby preventing current, illustrated by the dashed line, from flowing through the pull-down resistors. When the pull-down resistors 215, 217 are disconnected from ground, the voltage presented at the CC pins 205, 207 may be 3V, or more or less. When no power is delivered over the VBUS 231, the temperature of the thermistor 337 may cool. When the thermistor 337 cools to a certain temperature, its resistance may increase to a level high enough to create a voltage between the voltage divider sufficient to turn the MOSFET 330 back on.

As the CC pins 205, 207 are connected to corresponding CC pins on the DFP, a controller, such as controller 260, may detect that the particular voltages at the CC pins of the DFP are greater than the particular value required to trigger power delivery on the VBUS. As a result, the controller may determine that a valid connection is no longer present and cease power delivery to the UFP 225 via the VBUS 231.

Figure 6:
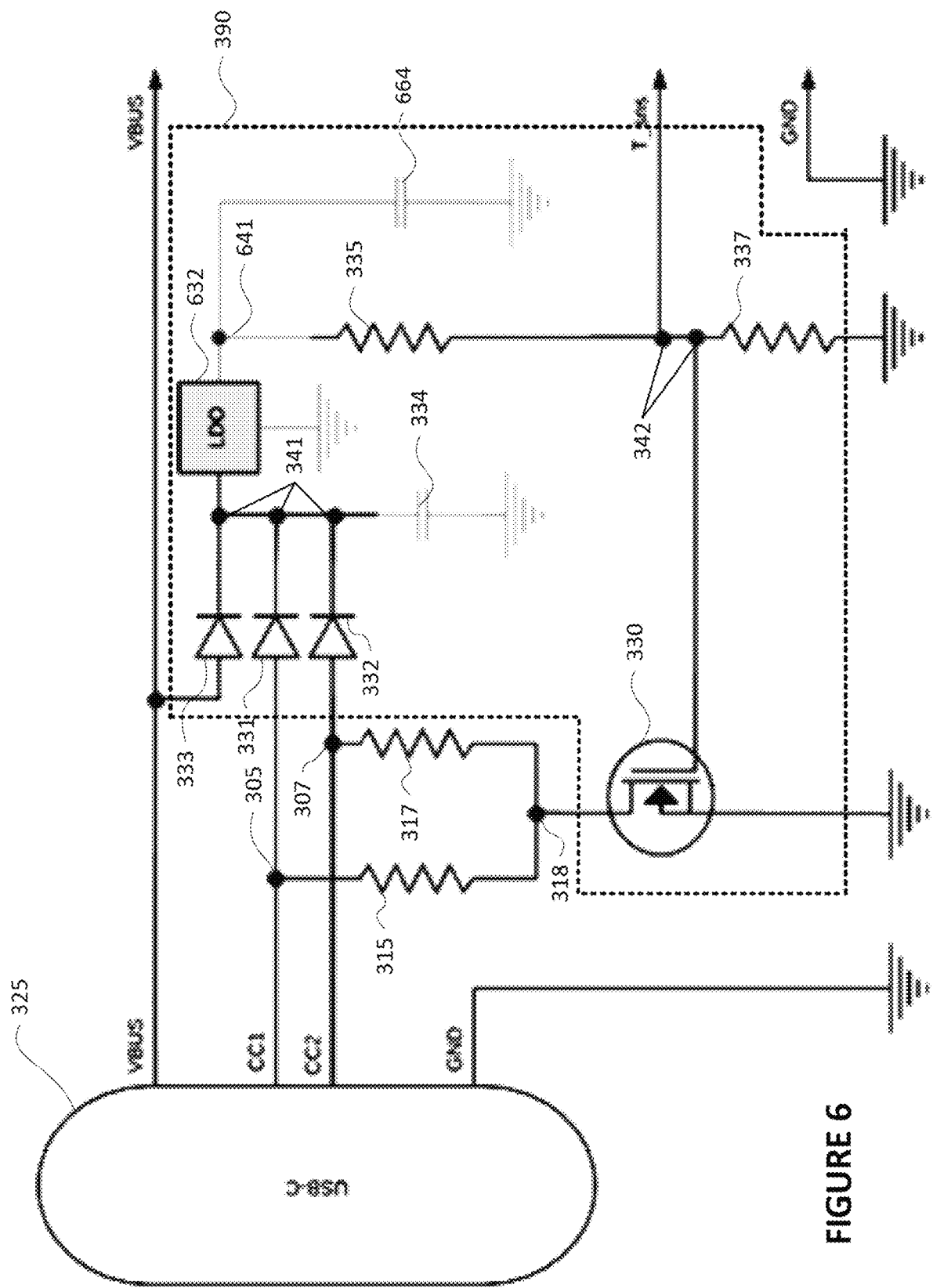
FIG. 6 is an example circuit diagram of a short circuit protection circuit including a low-dropout regulator according to aspects of the disclosure.

In some instances a low dropout regulator (LDO) and associated capacitor may be integrated into the SCPC 390 to provide a regulated voltage to the voltage divider formed by resistor 335 and thermistor 337. For example, and as illustrated in FIG. 6, an LDO may be positioned after junction 341 and tied to resistor 335 at junction 641. Capacitor 664 ties junction 641 to ground. Capacitor 664 may have a relatively small capacitance, such as 0.1 µF, or more or less. During a voltage change at junction 641, capacitor 664 may release a stored charge to maintain a consistent voltage at junction 641. The LDO may also present a lower voltage to the voltage divider than provided by the VBUS, such that the voltage output at junction 342 may be lower to turn the MOSFET when the thermistor 337 at a lower temperature that if a higher voltage was presented to the voltage divider.

The SCPC 390 is a non-latching and self-recovering circuit. In this regard, turning off power on the VBUS 231 allows the temperature of the thermistor to decrease, thereby increasing the resistance of the thermistor. The increase of resistance within the thermistor may cause the voltage divider (i.e., resistor 335 and thermistor 337) to generate a voltage at junction 342 which turns MOSFET 330 back on. Turning the MOSFET 330 back on may result in power again being delivered to the VBUS 231. The MOSFET 330 may remain on until the heat generated by the short circuited VBUS 231 again causes the resistance of the thermistor to decrease to a point where the voltage supplied to the MOSFET is unable to keep the MOSFET 330 on. This cycle of the MOSFET 330 turning on and off as a result of the temperature and resistance of the thermistor rising and falling may continue indefinitely.

In some instances, upon a short circuit event occurring on the VBUS, the VBUS may not sustain full voltage, such as 5V, or more or less. The reduced voltage on VBUS may provide the divider with a lower voltage, thereby allowing the voltage across 337 to be lower. As such, the MOSFET may turn off when the thermistor 337 is at a lower voltage, than if full voltage was provided to the voltage divider.

In some instances, a controller or other such processor may monitor the voltage at junction 342. For instance, an electronic device which is connected to UFP 225 may receive a temperature sense signal line (T_sns, shown in FIGS. 3-6) which provides the voltage of the voltage divider formed by resistor 335 and thermistor 337. Based on the voltage, the electronic device may be able to determine the resistance and temperature of the thermistor 337. For example, and as shown in FIG. 6, resistor 335 and thermistor 337 are powered by VBUS, which may provide a regulated voltage of 5V, or more or less, through diode 333. The voltage drop on thermistor 337 and at junction 342 is a function of temperature of the thermistor 337. Thus, depending on the voltage of the T_sns signal line at junction 342, the temperature and voltage of the thermistor 337 may be determined. This temperature and voltage information may be used for diagnostic and monitoring purposes to provide warnings or to take action upon the temperature rising or voltage falling outside a threshold value.

While the examples described above primarily relate to USB Type-C connector systems, it should be understood that the power line short circuit protection circuit may be implemented in any of a number of connector systems which provide power over a supply line based on the detection of a particular voltage on another line of the system.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A short circuit protection circuit, the short circuit protection circuit comprising:
a first configuration channel line extending from a first pin of an upstream facing universal serial bus (USB) type-C port;
a first resistor connected to the first configuration channel line;
a voltage divider connected to a junction point on the first configuration channel line, the voltage divider comprising a second resistor and a thermistor, wherein the thermistor is connected to a ground line;
a first diode positioned on the first configuration channel line between the first resistor and the junction point;
a field effect transistor (FET) comprising a source, gate, and drain, wherein the drain is connected to the first resistor, the source is connected to the ground line, and the gate is connected to a second junction point between the second resistor and thermistor of the voltage divider.

2. The short circuit protection circuit of claim 1, wherein the first configuration channel line outputs a voltage at the first pin when the FET is on.

3. The short circuit protection circuit of claim 1, wherein the voltage divider outputs a voltage at the second junction point.

4. The short circuit protection circuit of claim 1, further comprising a second configuration channel line extending from a second pin of the USB type-C port.

5. The short circuit protection circuit of claim 4, further comprising a third resistor connected to the second configuration channel line, wherein the third resistor is connected to the drain of the FET.

6. The short circuit protection circuit of claim 5, further comprising a second diode positioned on the second configuration channel line between the third resistor and the junction point.

7. The short circuit protection circuit of claim 1, further comprising a capacitor, wherein the capacitor is connected on a first end to a second junction on the configuration channel line located between the first diode and the second resistor and the capacitor is connected on a second end to the ground line.

8. The short circuit protection circuit of claim 7, wherein the capacitor stabilizes the voltage at the junction point.

9. The short circuit protection circuit of claim 1, wherein the FET is configured to turn on when a voltage at the gate is above a threshold value and turn off when the voltage at the gate is below the threshold value.

10. The short circuit protection circuit of claim 9, wherein power is delivered over a power supply line extending from the another pin when the FET is on and no power is delivered over the power supply line when the FET is off.

11. The short circuit protection circuit of claim 1, wherein the voltage divider outputs a lower voltage at the second junction point when the thermistor is at a higher temperature than when the thermistor is at a lower temperature.

12. The short circuit protection circuit of claim 1, further comprising a third diode, wherein the third diode connects a power supply line extending from a power pin to the junction point.

13. The short circuit protection circuit of claim 12, further comprising a low-dropout regulator (LDO) positioned inline between the junction point and the voltage divider, wherein the LDO stabilizes a voltage at the voltage divider and/or lowers the voltage provided at the junction point.

14. The short circuit protection circuit of claim 1, wherein the FET is metal-oxide-semiconductor field-effect transistor (MOSFET).

15. A system, comprising:
an upstream facing USB type-C port having a first set of pins;
a downstream facing USB type-C port having a second set of pins, wherein the downstream facing USB type-C port is configured to electrically connect to the upstream facing USB type-C port via one or more electrical connections between the first set of pins and the second set of pins;
a power supply line extending from a second pin in the downstream facing USB type-C port,
a power supply positioned downstream from the downstream facing USB type-C port for providing a voltage to a first configuration channel line at a first pin in the upstream facing USB type-C port, wherein the first pin in the upstream facing USB type-C port is connected to the first pin in the downstream facing USB type-C port;
a short circuit protection circuit positioned upstream from the upstream facing USB type-C port, the short circuit protection circuit comprising:
a voltage divider comprising a first resistor and a thermistor; and
a field effect transistor (FET);
a controller, positioned upstream from the upstream facing USB type-C port configured to detect the voltage on the first configuration channel line at the first pin in the upstream facing USB type-C port, wherein when the controller detects a voltage on the first pin in the upstream facing USB type-C port being above a threshold value, the controller triggers power delivery on the power supply line; and
a second resistor connected to the first configuration channel line;
a diode positioned between the second resistor and a first junction point on the first configuration channel line.

16. The system of claim 15, wherein the power is delivered on the power supply line from the upstream facing USB type-C port to the power supply line via a connection between a second pin in the upstream facing USB type-C port and the second pin in the downstream facing USB type-C port.

17. The system of claim 15, wherein the FET comprises a source, gate, and drain, wherein the drain is connected to the second resistor, the source is connected to a ground line, and the gate is connected to a second junction point between the first resistor and thermistor of the voltage divider,
wherein the FET is configured to turn on when a voltage at the gate is above a second threshold value, wherein when the FET is on, voltage at the first pin in the upstream facing USB type-C port is above the threshold value.

18. The system of claim 17, wherein the FET is configured to turn off upon a voltage at the gate being below the second threshold value, wherein when the FET is off, the voltage at the first pin in the upstream facing USB type-C port is below the threshold value.

* * * * *